US011411665B2

(12) United States Patent
Masal et al.

(10) Patent No.: US 11,411,665 B2
(45) Date of Patent: Aug. 9, 2022

(54) METHOD AND SYSTEM FOR ENABLING OF CROSS-LINK INTERFERENCE MEASUREMENT USING CLI-RS RESOURCE IN WIRELESS NETWORK

(71) Applicants: Centre of Excellence in Wireless Technology, Chennai (IN); Indian Institute of Technology Madras (IIT Madras), Chennai (IN)

(72) Inventors: Abhijeet Abhimanyu Masal, Chennai (IN); Priyanka Dey, Chennai (IN); Sunil Kaimalettu, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS), Chennai (IN)

(*) Notice: Subject to any disclaimer, the term of this patent is extended or adjusted under 35 U.S.C. 154(b) by 174 days.

(21) Appl. No.: 16/739,594

(22) Filed: Jan. 10, 2020

(65) Prior Publication Data

US 2020/0228213 A1 Jul. 16, 2020

(30) Foreign Application Priority Data

Jan. 11, 2019 (IN) .............................. 201941001474

(51) Int. Cl.
*H04B 17/345* (2015.01)
*H04B 17/318* (2015.01)
(Continued)

(52) U.S. Cl.
CPC ......... *H04B 17/345* (2015.01); *H04B 17/318* (2015.01); *H04J 11/0063* (2013.01); *H04L 5/0007* (2013.01); *H04L 5/0023* (2013.01); *H04L 5/0048* (2013.01); *H04L 5/0057* (2013.01); *H04L 5/0073* (2013.01); *H04W 24/10* (2013.01); *H04W 72/082* (2013.01)

(58) Field of Classification Search
None
See application file for complete search history.

(56) References Cited

U.S. PATENT DOCUMENTS

2018/0367346 A1* 12/2018 Chen .................... H04B 17/345
2020/0169435 A1* 5/2020 Kang .................. H04L 27/2607
(Continued)

*Primary Examiner* — Scott M Sciacca

(57) ABSTRACT

The method includes configuring a first CLI-RS configuration at a first UE (200a). Further, the method includes configuring a second CLI-RS configuration at a second UE (200b). Further, the method includes generating a CLI-RS sequence using a common CLI-RS reference point known to the first UE (200a) and the second UE (200b). Further, the method includes filling the CLI-RS sequence in the first set of CLI-RS resources indicated in the first CLI-RS configuration. Further, the method includes transmitting the CLI-RS sequence filled in the first set of CLI-RS resources indicated in the first CLI-RS configuration to the second UE (200b). Further, the method includes receiving the CLI-RS sequence transmitted by the first UE (200a). Further, the method includes processing the received CLI-RS sequence based on the second CLI-RS configuration.

37 Claims, 13 Drawing Sheets

(51) Int. Cl.
  *H04L 5/00*     (2006.01)
  *H04W 24/10*    (2009.01)
  *H04W 72/00*    (2009.01)
  *H04W 72/08*    (2009.01)
  *H04J 11/00*    (2006.01)

(56) References Cited

U.S. PATENT DOCUMENTS

2020/0344614 A1* 10/2020 Takano ................ H04B 17/345
2021/0176105 A1*  6/2021 Fei .......................... H04L 5/0048
2021/0219155 A1*  7/2021 Ye ........................... H04L 5/0048
2021/0250797 A1*  8/2021 Karjalainen ......... H04B 17/336

* cited by examiner

```
-- ASN1START
-- TAG-CSI-IM-RESOURCE-START
CSI-IM-Resource ::= SEQUENCE {
csi-IM-ResourceId    CSI-IM-ResourceId, csi-IM-ResourceElementPattern    CHOICE {
    pattern0    SEQUENCE {
        subcarrierLocation-p0    ENUMERATED { s0, s2, s4, s6, s8, s10 }, symbolLocation-p0    INTEGER (0..12)
    },
    pattern1    SEQUENCE { subcarrierLocation-p1    ENUMERATED { s0, s4, s8 },
        symbolLocation-p1    INTEGER (0..12)
    }
}    OPTIONAL, -- Need R freqBand    CSI-FrequencyOccupation    OPTIONAL, -- Need R
periodicityAndOffset    CSI-ResourcePeriodicityAndOffset    OPTIONAL, -- Cond -- Associated SRS id (New RRC parameter)
AssociatedSRS    SRS_ResourceId OPTIONAL,    -- Cond CLI measurement
...
}

-- TAG-CSI-IM-RESOURCE-STOP
-- ASN1STOP
```

FIG. 10

```
-- ASN1START
-- TAG-CSI-REPORTCONFIG-START
CSI-ReportConfig ::=    SEQUENCE { resourcesForChannelMeasurement    CSI-ResourceConfigId,
  csi-IM-ResourcesForInterference   CSI-ResourceConfigId  OPTIONAL,
        -- Need csi-IM-ResourcesForCLI            CSI-ResourceConfigId  OPTIONAL,
  ......--Omitted unchaged part............
  ReportQuantity   CHOICE{ none
  Cri-RMI-CQI       I-P         NULL
  Cri-RI-i1                     NULL
  cri-RI-i1-CQI                 SEQUENCE {
  Pdsch-BundleSizeForCSI                ENUMERATED {n2, n4}    OPTIONAL  -- Need S
  },
  Cri-RI-CQI                    NULL
  Cri-RSRP                      NULL
  Ssb-index-RSRP                NULL
  Cri-RI-Li-PMI-CQI             NULL
  -- CLI measurment (New RRC parameter)
    Srs-RSRP                    NULL
    Cli-RSSI                    NULL
  }
```

FIG. 11

METHOD AND SYSTEM FOR ENABLING OF CROSS-LINK INTERFERENCE MEASUREMENT USING CLI-RS RESOURCE IN WIRELESS NETWORK

FIELD OF INVENTION

The present disclosure relates to a communication system, and more specifically related to a method and system for enabling of cross-link interference measurement using a CLI reference signal (CLI-RS) resource in a wireless network. The present application is based on, and claims priority from an Indian Application Number 201941001474 filed on 11 Jan., 2019, the disclosure of which is hereby incorporated by reference herein.

BACKGROUND OF INVENTION

Fifth-generation new radio (NR) communication technology is being developed by 3rd Generation Partnership Project (3GPP). The NR supports a dynamic selection of uplink (UL) and downlink (DL) transmission on a paired and unpaired spectrum in a time duplexed manner which is referred to as flexible duplexing and the UL-DL selection can be configured based on cellular traffic, which can be asymmetric in nature and may vary over time and/or across geographical locations. This improves system throughput due to effective utilization of available resources. Since, a transmission direction is instantaneously decided, the transmission direction can lead to base station-to-base station (BS-to-BS) and user equipment-to-user equipment (UE-to-UE) cross-link interference (CLI) apart from co-channel interference in cellular communication. For example, in FIG. 1, UE-1 (200a) and UE-2 (200b) are associated with BS-1 (100a) and BS-2 (100b) respectively. The BS (e.g. 100a, 100b) can be Evolved Node B (eNB), gNodeB (gNB), integrated access and backhaul (IAB), etc. Due to flexible duplexing, when the BS-2 (100b) transmits in the DL to the UE-2 (200b) and the UE-1 (200a) transmits in the UL to the BS-1 (100a), the UL from the UE-1 (200a) interferes with the DL reception at the UE-2 (200b). The CLI limits the system's performance, and therefore, it needs to be mitigated to achieve the full benefits of flexible duplexing.

Thus, it is desired to address the above mentioned disadvantages or other shortcomings or at least provide a useful alternative.

OBJECT OF INVENTION

The principal object of the embodiments herein is to provide a method and system for enabling a cross-link interference (CLI) measurement using a CLI reference signal (CLI-RS) resource in a wireless network.

Another object of the embodiments is to configure a first CLI-RS configuration at a first UE, where the first CLI-RS configuration comprises a first set of CLI-RS resources.

Another object of the embodiments is to configure a second CLI-RS configuration at a second UE, where the second CLI-RS configuration comprises a second set of CLI-RS resources.

Another object of the embodiments is to generate a CLI-RS sequence using a common CLI-RS reference point known to a first BS and a second BS.

Another object of the embodiments is to fill the CLI-RS sequence in the first set of CLI-RS resources indicated in the first CLI-RS configuration.

Another object of the embodiments is to transmit the CLI-RS sequence filled in the first set of CLI-RS resources indicated in the first CLI-RS configuration to the second UE.

Another object of the embodiments is to receive the CLI-RS sequence transmitted by the first UE.

Another object of the embodiments is to process the received CLI-RS sequence based on the second CLI-RS configuration.

BRIEF SUMMARY OF THE INVENTION

Accordingly, the invention provides a method for enabling a cross-link interference (CLI) measurement using a CLI reference signal (CLI-RS) resource in a wireless network. The method includes configuring, by a first Base station (BS) associated with a first user equipment (UE), a first CLI-RS configuration at the first UE, where the first CLI-RS configuration comprises a first set of CLI-RS resources. Further, the method includes configuring, by a second BS associated with a second UE, a second CLI-RS configuration at the second UE, where the second CLI-RS configuration comprises a second set of CLI-RS resources. Further, the method includes generating, by the first UE, a CLI-RS sequence using a common CLI-RS reference point known to the first UE and the second UE. Further, the method includes filling, by the first UE, the CLI-RS sequence in the first set of CLI-RS resources indicated in the first CLI-RS configuration. Further, the method includes transmitting, by the first UE, the CLI-RS sequence filled in the first set of CLI-RS resources indicated in the first CLI-RS configuration to the second UE. Further, the method includes receiving, by the second UE, the CLI-RS sequence transmitted by the first UE. Further, the method includes processing, by the second UE, the received CLI-RS sequence based on the second CLI-RS configuration.

In an embodiment, the processing the received CLI-RS sequence based on the second CLI-RS configuration includes determining, by the second UE, a received power of the CLI-RS sequence, and reporting, by the second UE, the received power to the second BS based on a reporting configuration provided by the second BS.

In an embodiment, the first BS receives the first CLI-RS configuration by one of the second BS and a centralized network entity connected to the first BS.

In an embodiment, the second BS receives the second CLI-RS configuration by one of the first BS and the centralized network entity connected to the second BS.

In an embodiment, the first set of CLI-RS resources indicated in the first CLI-RS configuration comprise at least one of a start index of frequency domain resource, a number of frequency-domain resource, a start index of the time domain resource, a number of time-domain resources, a CLI-RS sequence Identifier (ID), a number of antenna ports, a time-domain behavior, and a quasi-co-location (QCL) assumption.

In an embodiment, the second set of CLI-RS resources indicated in the second CLI-RS configuration comprise at least one of a start index of frequency domain resource, a number of frequency-domain resource, a start index of the time domain resource, a number of time-domain resources, a CLI-RS sequence Identifier (ID), a number of antenna ports, a time-domain behavior, and a quasi-co-location (QCL) assumption.

The start index of frequency domain resource is the starting subcarrier in frequency-domain. The number of frequency-domain resources is the number of subcarriers over which the CLI-RS spans. The start index of the time domain resource is the starting symbol in time-domain. The number of time-domain resources is the number of symbols in time-domain over which the CLI-RS spans. The CLI-RS sequence ID is the ID to generate a unique CLI-RS sequence. The number of antenna ports is the number of ports over which CLI-RS is transmitted. The time-domain behavior defines the nature of CLI-RS resource in time e.g. aperiodic, semi-static and periodic, aperiodic CLI-RS resource reception triggers by physical layer using downlink control information (DCI) in the second UE, semi static CLI-RS resource triggers for fixed time interval by MAC layer whereas periodic triggers by radio resource control layer. The QCL assumption gives relation of CLI-RS with respect to the other RSs received in terms of delay spread, average delay, Doppler spread, Doppler shift and spatial receiver parameter.

In an embodiment, the first set of CLI-RS resources indicated by the first CLI-RS configuration overlaps in one of fully and partially with the second set of CLI-RS resources indicated in the second CLI-RS configuration.

In an embodiment, the common CLI-RS reference point known to the first BS and the second BS is preconfigured by a network entity at the first BS and the second BS.

In an embodiment, the common CLI-RS reference point is shared by the first BS with the first UE in the first CLI-RS configuration and where the common reference point is shared by the second BS with the second UE in the second CLI-RS configuration.

In an embodiment, the common CLI-RS reference point is a reference frequency used to identify the start index of resource in frequency-domain.

In an embodiment, the received power is determined using at least one of a CLI-reference signal received power (CLI-RSRP) and CLI-received signal strength indicator (CLI-RSSI).

In an embodiment, the CLI-RSRP is determined by, detecting, by the second UE, the CLI-RS sequence transmitted by the first UE, measuring, by the second UE, a linear average of the received power of the CLI-RS sequence over the second set of CLI-RS resources indicated in the second CLI-RS configuration, and determining, by the second UE, the CLI-RSRP based on the detected the CLI-RS sequence and the measured linear average of the received power.

In an embodiment, the CLI-RSSI is determined by, measuring, by the second UE, a linear average of the received power of the CLI-RS sequence over the second set of CLI-RS RS resources indicated in the second CLI-RS configuration, and determining, by the second UE, the CLI-RSSI based on the measured linear average.

In an embodiment, the reporting configuration comprises the second CLI-RS configuration and at least one of the CLI-RSRP and the CLI-RSSI.

In an embodiment, the second CLI-RS configuration configured at the second UE is one of a Zero Power (ZP-RS) configuration.

In an embodiment, the ZP-RS configuration indicates at least one resource over which the second BS has not transmitted any signal.

In an embodiment, the at least one resources overlaps in one of fully and partially with the first set of CLI-RS resources indicated in the first CLI-RS configuration.

In an embodiment, the first CLI-RS configuration configured at the first UE is a sounding reference signal (SRS) configuration.

In an embodiment, the SRS configuration contains a plurality of parameters comprising a quasi-co-location assumption (QCL), SRS sequence ID, pointA, a frequency domain shift, a cyclic shift, a numerology, comb pattern for SRS transmission, a comb offset, number of resource blocks, a bandwidth part configuration, a start symbol of SRS, number of SRS symbols, repetition factor.

The SRS sequence ID is id used for unique sequence generation. PointA is a reference point corresponding to the carrier frequency. The frequency-domain shift is an offset from PointA. The cyclic shift is sequence rotation for generation of orthogonal sequence. The numerology is sub-carrier spacing of SRS transmission. The comb pattern for SRS transmission provides SRS frequency resource location per resource block. The comb offset provides one pattern from possible comb patterns. The number of RBs provides a total number of resource blocks over which SRS will be transmitted. The bandwidth part configuration defines the bandwidth part used for SRS transmission. The start symbol of SRS is the start index of the time domain resource of SRS. The number of SRS symbols provide the OFDM symbols over which SRS is transmitted. The repetition factor provides a number of times the SRS resource is repeated in time-domain.

In an embodiment, the SRS sequence ID is used to generate an SRS sequence, and where the SRS sequence is generated starting from the common CLI-RS reference point.

In an embodiment, the plurality of parameters is limited based on a number of UEs suffering from the CLI.

In an embodiment, transmitting, by the first UE, the CLI-RS sequence filled in the first set of CLI-RS resources indicated in the first CLI-RS configuration by one of, repeating, by the first UE, the first set of CLI-RS resources over a number of consecutive Orthogonal frequency-division multiplexing (OFDM) symbols with a block-cyclic prefix (CP), and repeating, by the first UE, the first set of CLI-RS resources over a number of consecutive OFDM symbols, with a phase rotation except a last symbol of the set of OFDM symbols.

In an embodiment, the block CP is a common CP for the set of consecutive OFDM symbols.

Accordingly, the embodiments herein provide a first base station (BS) for enabling a cross-link interference (CLI) measurement using a CLI reference signal (CLI-RS) resource in a wireless network. The first base station includes a CLI-RS controller coupled with a processor and a memory. The CLI-RS controller configures a first CLI-RS configuration at the first UE, where the first CLI-RS configuration comprises a first set of CLI-RS resources.

Accordingly, the embodiments herein provide a second base station (BS) for enabling a cross-link interference (CLI) measurement using a CLI reference signal (CLI-RS) resource in a wireless network. The second base station includes a CLI-RS controller coupled with a processor and a memory. The CLI-RS controller configures a second CLI-RS configuration at the second UE, where the second CLI-RS configuration comprises a second set of CLI-RS resources.

Accordingly, the embodiments herein provide a first user equipment (UE) for enabling a cross-link interference (CLI) measurement using a CLI reference signal (CLI-RS) resource in a wireless network. The first UE includes a CLI-RS controller coupled with a processor and a memory. The CLI-RS controller configured to generate a CLI-RS sequence using a common CLI-RS reference point known to the first UE and the second UE, fill the CLI-RS sequence in the first set of CLI-RS resources indicated in the first CLI-RS configuration and transmit the CLI-RS sequence filled in the first set of CLI-RS resources indicated in the first CLI-RS configuration to the second UE.

Accordingly, the embodiments herein provide a second user equipment (UE) for enabling a cross-link interference (CLI) measurement using a CLI reference signal (CLI-RS) resource in a wireless network. The second UE includes a CLI-RS controller coupled with a processor and a memory. The CLI-RS controller configures to receive the CLI-RS sequence transmitted by the first UE, and process the received CLI-RS sequence based on the second CLI-RS configuration.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 10 illustrates a CSI-IM-Resource IE modification, according to an embodiment as disclosed herein; and FIG. 11 illustrates a CSI-ReportConfig IE modification, according to an embodiment as disclosed herein.

DETAILED DESCRIPTION OF THE INVENTION

Figure 1:
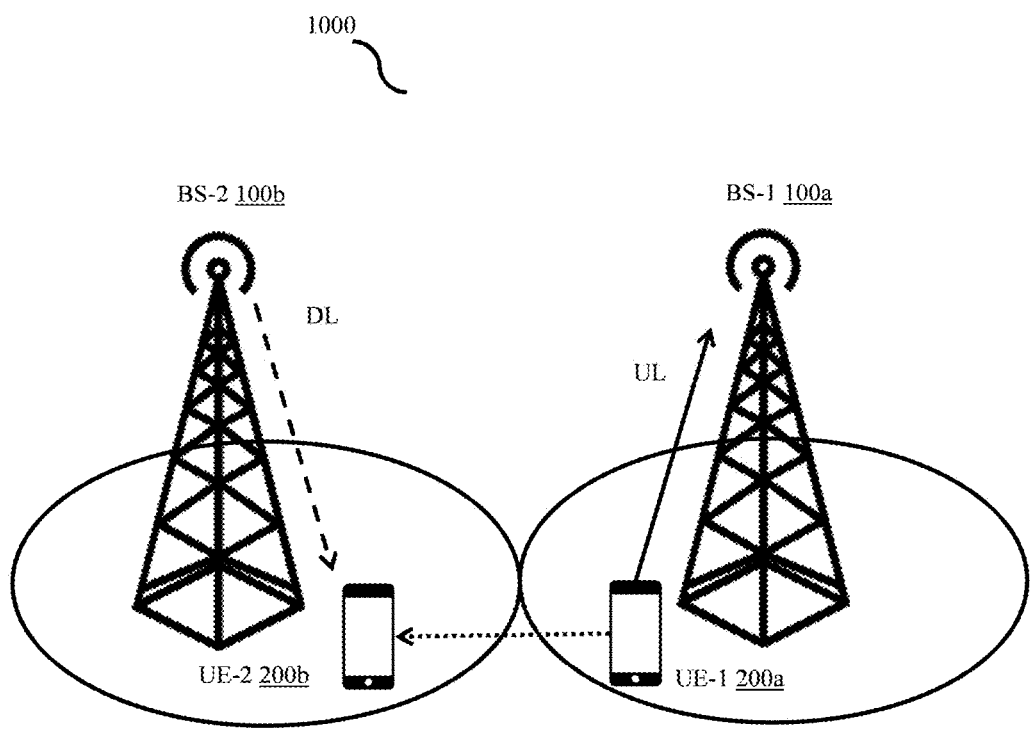
FIG. 1 illustrates a user equipment (UE)-to-UE cross-link interference (CLI) in flexible duplexing.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the invention provides a method for enabling a cross-link interference (CLI) measurement using a CLI reference signal (CLI-RS) resource in a wireless network. The method includes configuring, by a first Base station (BS) associated with a first user equipment (UE), a first CLI-RS configuration at the first UE, where the first CLI-RS configuration comprises a first set of CLI-RS resources. Further, the method includes configuring, by a second BS associated with a second UE, a second CLI-RS configuration at the second UE, where the second CLI-RS configuration comprises a second set of CLI-RS resources. Further, the method includes generating, by the first UE, a CLI-RS sequence using a common CLI-RS reference point known to the first UE and the second UE. Further, the method includes filling, by the first UE, the CLI-RS sequence in the first set of CLI-RS resources indicated in the first CLI-RS configuration. Further, the method includes transmitting, by the first UE, the CLI-RS sequence filled in the first set of CLI-RS resources indicated in the first CLI-RS configuration to the second UE. Further, the method includes receiving, by the second UE, the CLI-RS sequence transmitted by the first UE. Further, the method includes processing, by the second UE, the received CLI-RS sequence based on the second CLI-RS configuration.

Referring now to the drawings, and more particularly to FIGS. 2A through 11, where similar reference characters denote corresponding features consistently throughout the figures, there are shown preferred embodiments.

Figure 2A:
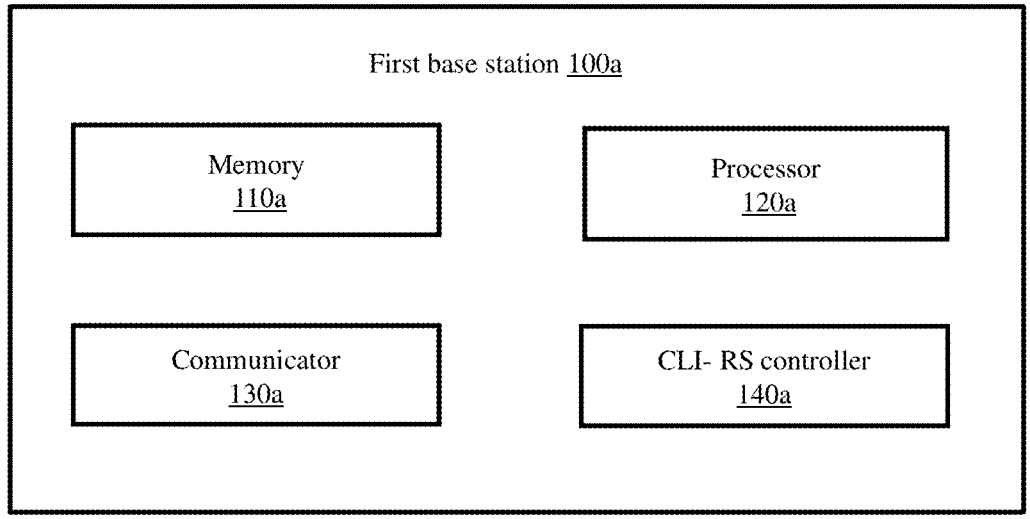
FIG. 2A illustrates a block diagram of a first base station (BS) for enabling a cross-link interference (CLI) measurement using a CLI reference signal (CLI-RS) resource in a wireless network, according to an embodiment as disclosed herein.

FIG. 2A illustrates a block diagram of a first base station (BS) (100a) for enabling a cross-link interference (CLI) measurement using a CLI reference signal (CLI-RS) resource in a wireless network (1000), according to an embodiment as disclosed herein. In an embodiment, a first BS (100a) includes a memory (110a), a processor (120a), a communicator (130a), and a CLI-RS controller (140a).

The memory (110a) also stores instructions to be executed by the processor (120a). The memory (110a) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110a) may, in some examples, be considered a non-transitory storage medium. The term "non-transitory" may indicate that the storage medium is not embodied in a carrier wave or a propagated signal. However, the term "non-transitory" should not be interpreted that the memory (110a) is non-movable. In some examples, the memory (110a) can be configured to store larger amounts of information than the memory. In certain examples, a non-transitory storage medium may store data that can, over time, change (e.g., in Random Access Memory (RAM) or cache).

The processor (120a) communicates with the memory (110a), the communicator (130a), and the CLI-RS controller (140a). In an embodiment, the memory (110a) can be an internal storage unit or it can be an external storage unit of the first BS (100a), a cloud storage, or any other type of external storage. The processor (120a) is configured to execute instructions stored in the memory (110a) and to perform various processes.

The communicator (130a) is configured for communicating internally between internal hardware components and with external devices via one or more networks.

In an embodiment, the CLI-RS controller (140a) configures a first CLI-RS configuration at a first UE (200a), where the first CLI-RS configuration comprises a first set of CLI-RS resources.

Although the FIG. 2A shows various hardware components of the first BS (100a) but it is to be understood that other embodiments are not limited thereon. In other embodiments, the first BS (100a) may include less or more number of components. Further, the labels or names of the components are used only for illustrative purpose and does not limit the scope of the invention. One or more components can be combined together to perform same or substantially similar function to enable the CLI measurement using a CLI reference signal (CLI-RS) in the wireless network (1000).

Figure 2B:
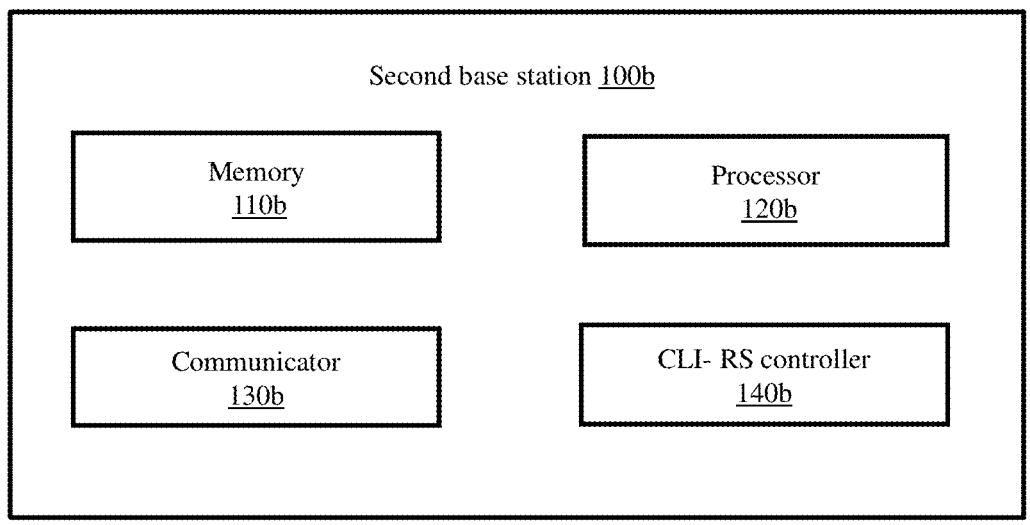
FIG. 2B illustrates a block diagram of a second BS for enabling the CLI measurement using the CLI-RS resource in the wireless network, according to an embodiment as disclosed herein.

FIG. 2B illustrates a block diagram of a second BS (100b) for enabling the CLI measurement using the CLI-RS resource in the wireless network (1000), according to an embodiment as disclosed herein.

In an embodiment, the second BS (100b) includes a memory (110b), a processor (120b), a communicator (130b), and a CLI-RS controller (140b).

The memory (110b) also stores instructions to be executed by the processor (120b). The memory (110b) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110b) may, in some examples, be considered a non-transitory storage medium. The term "non-transitory" may indicate that the storage medium is not embodied in a carrier wave or a propagated signal. However, the term "non-transitory" should not be interpreted that the memory (110b) is non-movable. In some examples, the memory (110b) can be configured to store larger amounts of information than the memory. In certain examples, a non-transitory storage medium may store data that can, over time, change (e.g., in Random Access Memory (RAM) or cache).

The processor (120b) communicates with the memory (110b), the communicator (130b), and the CLI-RS controller (140b). In an embodiment, the memory (110b) can be an internal storage unit or it can be an external storage unit of the second BS (100b), a cloud storage, or any other type of external storage. The processor (120b) is configured to execute instructions stored in the memory (110b) and to perform various processes.

The communicator (130b) is configured for communicating internally between internal hardware components and with external devices via one or more networks.

In an embodiment, the CLI-RS controller (140b) configures a second CLI-RS configuration at a second UE (200b), where the second CLI-RS configuration comprises a second set of CLI-RS resources.

Although the FIG. 2B shows various hardware components of the second BS (100b) but it is to be understood that other embodiments are not limited thereon. In other embodiments, the second BS (100b) may include less or more number of components. Further, the labels or names of the components are used only for illustrative purpose and does not limit the scope of the invention. One or more components can be combined together to perform same or substantially similar function to enable the CLI measurement using a CLI reference signal (CLI-RS) in the wireless network (1000).

Figure 3A:
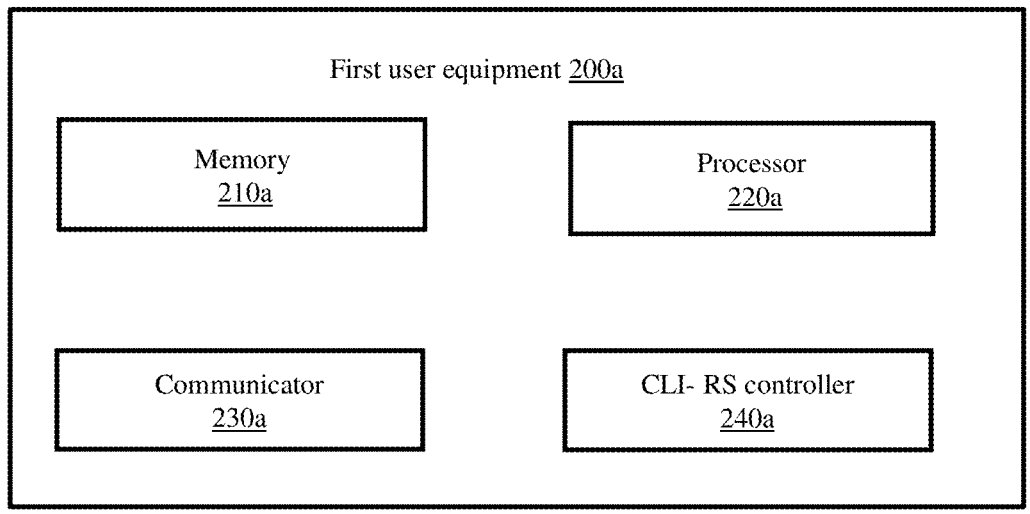
FIG. 3A illustrates a block diagram of a first UE for enabling the CLI measurement using the CLI-RS resource in the wireless network, according to an embodiment as disclosed herein.

FIG. 3A illustrates a block diagram of the first UE (200a) for enabling the CLI measurement using the CLI-RS resource in the wireless network (1000), according to an embodiment as disclosed herein. In an embodiment, the first UE (200a) includes a memory (210a), a processor (220a), a communicator (230a), and a CLI-RS controller (240a). The first UE (200a) can be, for example, but not limited to a smartphone, a tablet, or a like.

The memory (210a) also stores instructions to be executed by the processor (220a). The memory (210a) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210a) may, in some examples, be considered a non-transitory storage medium. The term "non-transitory" may indicate that the storage medium is not embodied in a carrier wave or a propagated signal. However, the term "non-transitory" should not be interpreted that the memory (210a) is non-movable. In some examples, the memory (210a) can be configured to store larger amounts of information than the memory. In certain examples, a non-transitory storage medium may store data that can, over time, change (e.g., in Random Access Memory (RAM) or cache).

The processor (220a) communicates with the memory (210a), the communicator (230a), and the CLI-RS controller (240a). In an embodiment, the memory (210a) can be an internal storage unit or it can be an external storage unit of the first UE (200a), a cloud storage, or any other type of external storage. The processor (220a) is configured to execute instructions stored in the memory (210a) and to perform various processes.

The communicator (230a) is configured for communicating internally between internal hardware components and with external devices via one or more networks.

In an embodiment, the CLI-RS controller (240a) generates a CLI-RS sequence using a common CLI-RS reference point known to the first UE (200a) and the second UE (200b). Further, the CLI-RS controller (240a) fills the CLI-RS sequence in the first set of CLI-RS resources indicated in the first CLI-RS configuration. Further, the CLI-RS controller (240a) transmits the CLI-RS sequence filled in the first set of CLI-RS resources indicated in the first CLI-RS configuration to the second UE (200b).

Further, the CLI-RS controller (240a) repeats the first set of CLI-RS resources over a number of consecutive orthogonal frequency-division multiplexing (OFDM) symbols with a block-cyclic prefix (CP). Further, the CLI-RS controller (240a) repeats the first set of CLI-RS resources over a number of consecutive OFDM symbols, with a phase rotation except for the last symbol of the set of OFDM symbols.

Although the FIG. 3A shows various hardware components of the first UE (200a) but it is to be understood that other embodiments are not limited thereon. In other embodiments, the first UE (200a) may include less or more number of components. Further, the labels or names of the components are used only for illustrative purpose and does not limit the scope of the invention. One or more components can be combined together to perform same or substantially similar function to enable the CLI measurement using a CLI reference signal (CLI-RS) resource in the wireless network (1000).

Figure 3B:
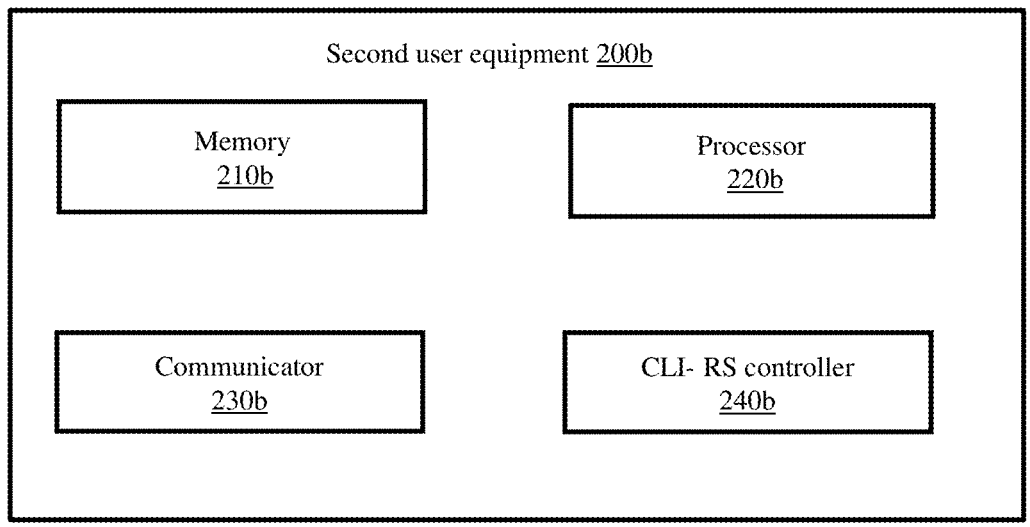
FIG. 3B illustrates a block diagram of a second UE for enabling the CLI measurement using the CLI-RS resource in the wireless network, according to an embodiment as disclosed herein.

FIG. 3B illustrates a block diagram of the second UE (200b) for enabling the CLI measurement using the CLI-RS resource in the wireless network (1000), according to an embodiment as disclosed herein. The second UE (200b) can be, for example, but not limited to a smartphone, a tablet, or a like.

In an embodiment, the second first UE (200a) includes a memory (210b), a processor (220b), a communicator (230b), and a CLI-RS controller (240b).

The memory (210b) also stores instructions to be executed by the processor (220b). The memory (210b) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210b) may, in some examples, be considered a non-transitory storage medium. The term "non-transitory" may indicate that the storage medium is not embodied in a carrier wave or a propagated signal. However, the term "non-transitory" should not be interpreted that the memory (210b) is non-movable. In some examples, the memory (210b) can be configured to store larger amounts of information than the memory. In certain examples, a non-transitory storage medium may store data that can, over time, change (e.g., in Random Access Memory (RAM) or cache).

The processor (220b) communicates with the memory (210b), the communicator (230b), the CLI-RS controller (240b), and the CLI-RS power determiner (250b). In an embodiment, the memory (210b) can be an internal storage unit or it can be an external storage unit of the second UE (200b), a cloud storage, or any other type of external storage. The processor (220b) is configured to execute instructions stored in the memory (210b) and to perform various processes.

The communicator (230b) is configured for communicating internally between internal hardware components and with external devices via one or more networks.

In an embodiment, the CLI-RS controller (240b) receives the CLI-RS sequence transmitted by the first UE (200a). Further, the CLI-RS controller (240b) processes the received CLI-RS sequence based on the second CLI-RS configuration. Further, the CLI-RS controller (240b) determines a received power of the CLI-RS sequence. Further, the CLI-RS controller (240b) reports the received power to the second BS (100b) based on a reporting configuration provided by the second BS (100b). Further, the CLI-RS controller (240b) detects the CLI-RS sequence transmitted by the first UE (200a). Further, the CLI-RS controller (240b) measures a linear average of the received power of the CLI-RS sequence over the second set of CLI-RS resources indicated in the second CLI-RS configuration. Further, the CLI-RS controller (240b) determines the CLI-RSRP based on the detected the CLI-RS sequence and the measured linear average of the received power. Further, the CLI-RS controller (240b) determines the CLI-RSSI based on the measured linear average.

Although the FIG. 3B shows various hardware components of the second UE (200b) but it is to be understood that other embodiments are not limited thereon. In other embodiments, the second UE (200b) may include less or more number of components. Further, the labels or names of the components are used only for illustrative purpose and does not limit the scope of the invention. One or more components can be combined together to perform same or substantially similar function to enable the CLI measurement using a CLI reference signal (CLI-RS) resource in the wireless network (1000).

Figure 4A:
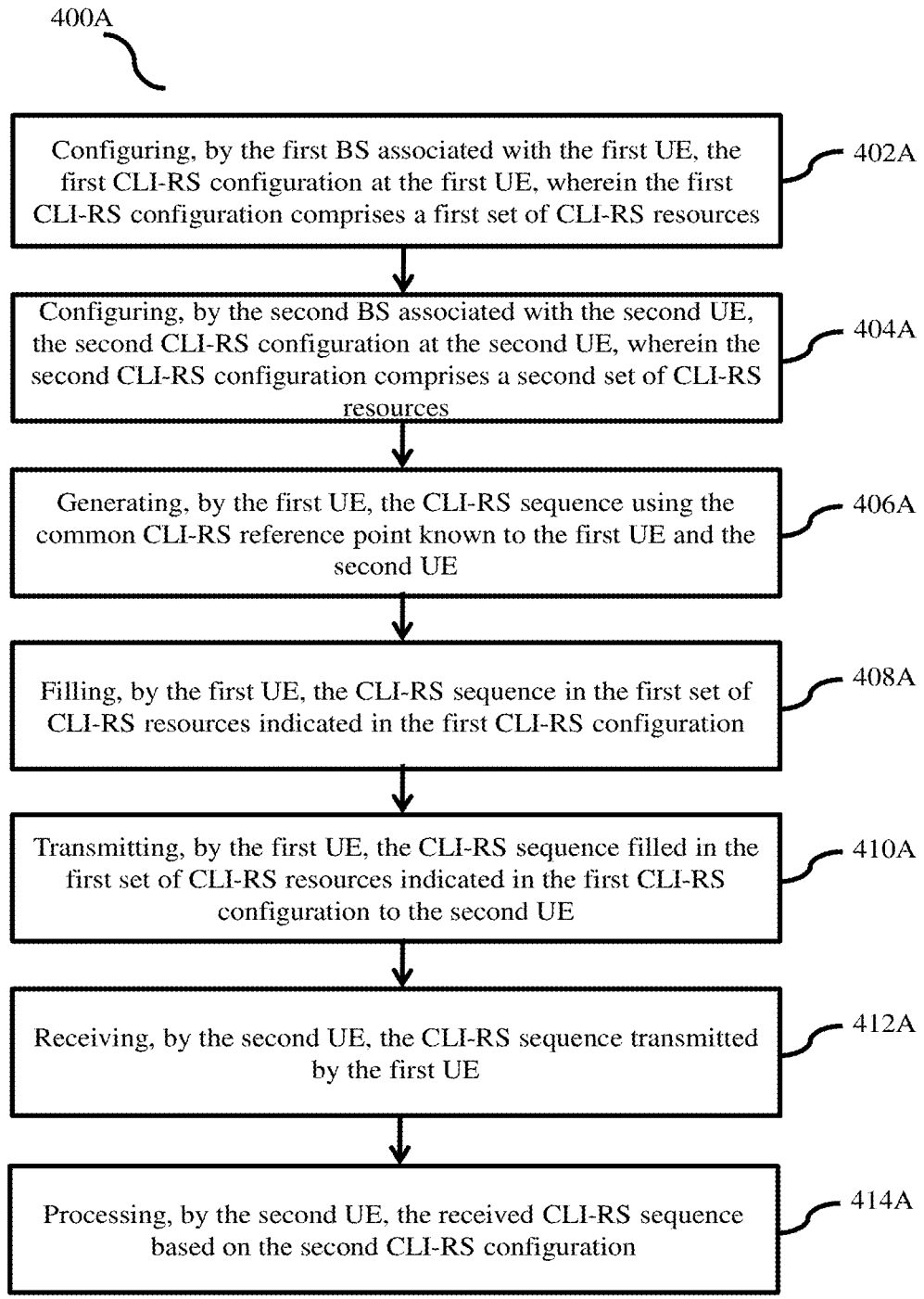
FIG. 4A is a flow diagram illustrating a method for enabling the CLI measurement using the CLI-RS resource in the wireless network, according to an embodiment as disclosed herein.

FIG. 4A is a flow diagram (400A) illustrating a method for enabling the CLI measurement using the CLI-RS resource in the wireless network (1000), according to an embodiment as disclosed herein.

At 402A, the method includes configuring, by the first BS (100*a*) associated with the first UE (200*a*), the first CLI-RS configuration at the first UE (200*a*), where the first CLI-RS configuration comprises a first set of CLI-RS resources. At 404A, the method includes configuring, by the second BS (100*b*) associated with the second UE (200*b*), the second CLI-RS configuration at the second UE (200*b*), where the second CLI-RS configuration comprises a second set of CLI-RS resources. At 406A, the method includes generating, by the first UE (200*a*), the CLI-RS sequence using the common CLI-RS reference point known to the first UE (200*a*) and the second UE (200*b*). At 408A, the method includes filling, by the first UE (200*a*), the CLI-RS sequence in the first set of CLI-RS resources indicated in the first CLI-RS configuration. At 410A, the method includes transmitting, by the first UE (200*a*), the CLI-RS sequence filled in the first set of CLI-RS resources indicated in the first CLI-RS configuration to the second UE (200*b*). At 412A, the method includes receiving, by the second UE (200*b*), the CLI-RS sequence transmitted by the first UE (200*a*). At 414A, the method includes processing, by the second UE (200*b*), the received CLI-RS sequence based on the second CLI-RS configuration.

Figure 4B:
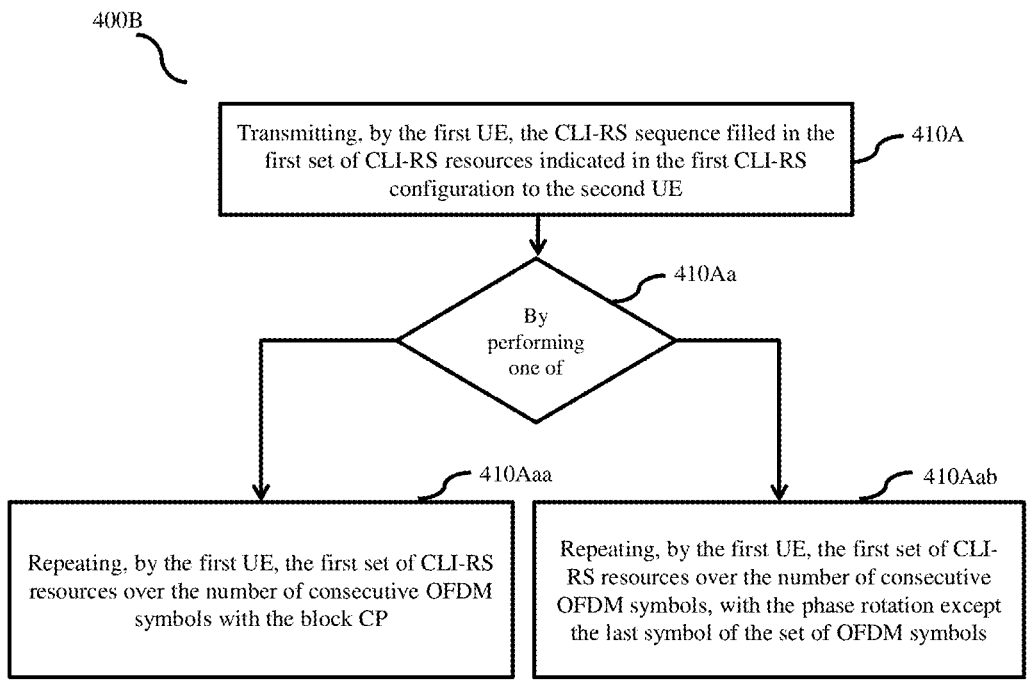
FIG. 4B is a flow diagram illustrating a method for transmitting a CLI-RS sequence filled in a first set of CLI-RS resources indicated in a first CLI-RS configuration to the second UE.

FIG. 4B is a flow diagram (400B) illustrating a method for transmitting the CLI-RS sequence filled in the first set of CLI-RS resources indicated in the first CLI-RS configuration to the second UE (200*b*).

At 410A, the method includes transmitting, by the first UE (200*a*), the CLI-RS sequence filled in the first set of CLI-RS resources indicated in the first CLI-RS configuration to the second UE (200*b*). At 410Aa, the method includes performing one of operation 410Aaa or 410Aab. At 410Aaa, the method includes repeating, by the first UE (200*a*), the first set of CLI-RS resources over the number of consecutive OFDM symbols with the block CP. At 410Aab, the method includes repeating, by the first UE (200*a*), the first set of CLI-RS resources over the number of consecutive OFDM symbols, with the phase rotation except for the last symbol of the set of OFDM symbols.

Figure 4C:
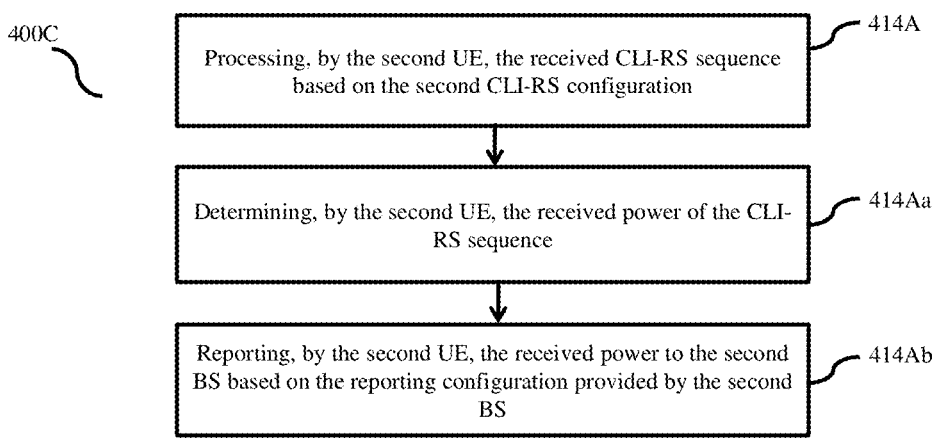
FIG. 4C is a flow diagram illustrating a method for processing a received CLI-RS sequence based on a second CLI-RS configuration.

FIG. 4C is a flow diagram (400C) illustrating a method for processing the received CLI-RS sequence based on the second CLI-RS configuration.

At 414A, the method includes processing, by the second UE (200*b*), the received CLI-RS sequence based on the second CLI-RS configuration. At 414Aa, the method includes determining, by the second UE (200*b*), the received power of the CLI-RS sequence. At 414Ab, the method includes reporting, by the second UE (200*b*), the received power to the second BS (100*b*) based on the reporting configuration provided by the second BS (100*b*).

Figure 4D:
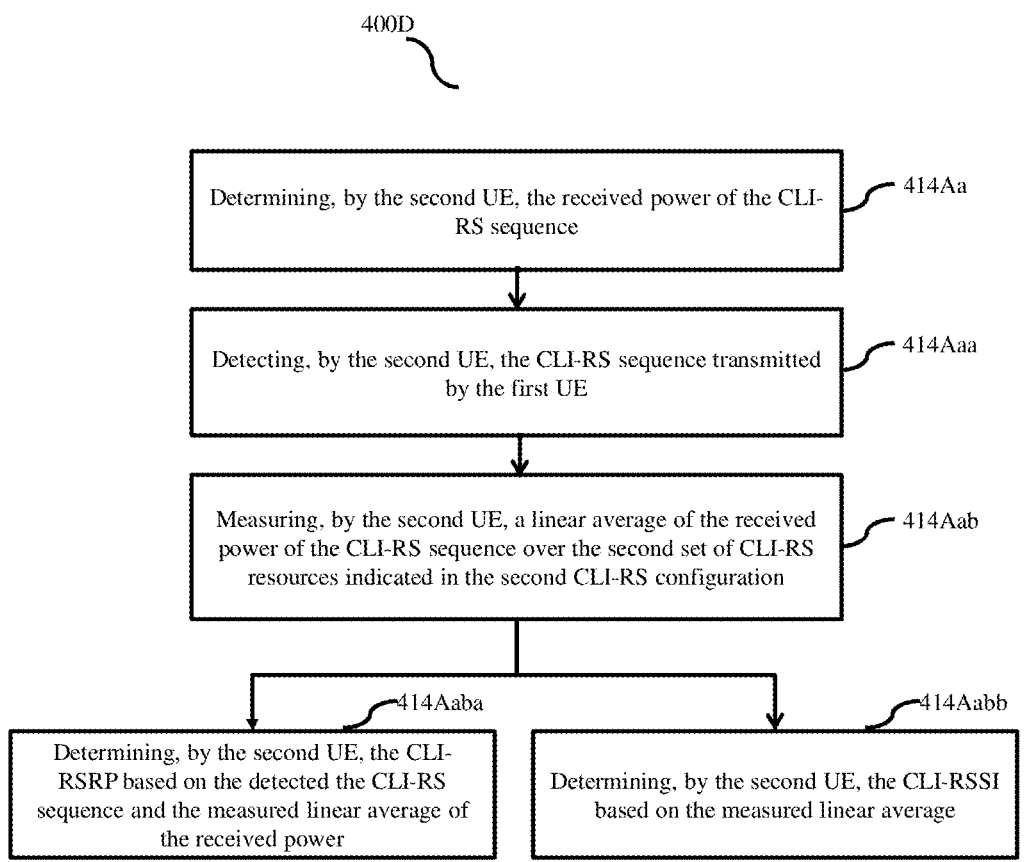
FIG. 4D is a flow diagram illustrating a method for determining using at least one of a CLI-reference signal received power (CLI-RSRP) and CLI-received signal strength indicator (CLI-SI)

FIG. 4D is a flow diagram (400D) illustrating a method for determining using at least one of a CLI-reference signal received power (CLI-RSRP) and CLI-received signal strength indicator (CLI-RSSI).

At 414Aa, the method includes determining, by the second UE (200*b*), the received power of the CLI-RS sequence. At 414Aaa, the method includes detecting, by the second UE (200*b*), the CLI-RS sequence transmitted by the first UE (200*a*). At 414Aab, the method includes measuring, by the second UE (200*b*), a linear average of the received power of the CLI-RS sequence over the second set of CLI-RS resources indicated in the second CLI-RS configuration. At 414Aaba, the method includes determining, by the second UE (200*b*), the CLI-RSRP based on the detected the CLI-RS sequence and the measured linear average of the received power. At 414Aabb, the method includes determining, by the second UE (200*b*), the CLI-RSSI based on the measured linear average.

The UE (200*a*) to UE (200*b*) CLI measurement procedure explained (FIG. 5 to FIG. 11) with respect to the UE (200*a*) to UE (200*b*) CLI. This can be extended to BS (100*a*) to BS (100*b*) interference scenario in systems like IAB.

Figure 5:
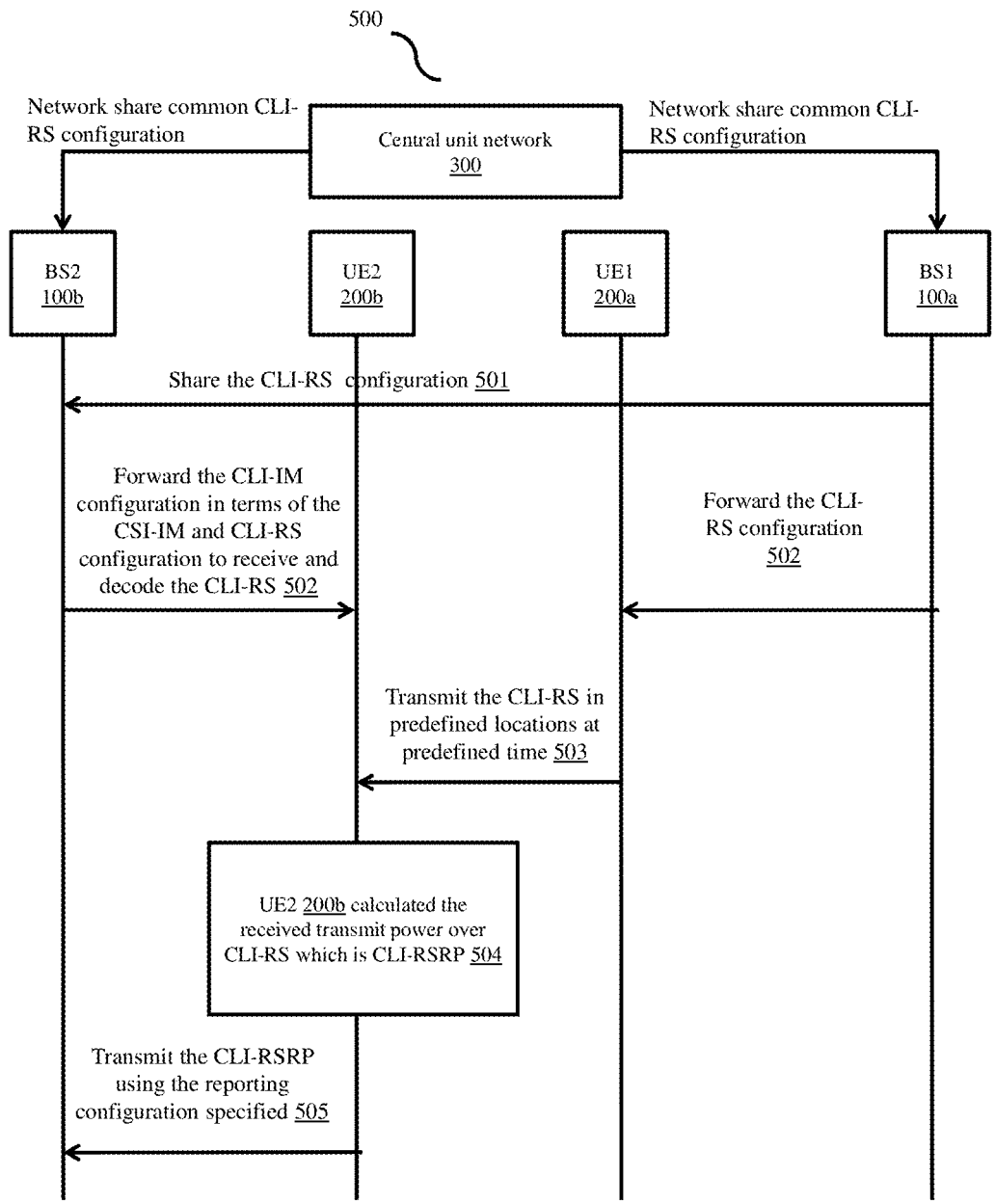
FIG. 5 is a sequence diagram illustrating logic of CLI-RSRP calculation, according to an embodiment as disclosed herein.

FIG. 5 is a sequence diagram (500) illustrating logic of CLI-RSRP calculation, according to an embodiment as disclosed herein.

A central unit network (300) shares a common CLI-RS configuration to the BS-1 (100*a*) and the BS-2 (100*b*). At 501, the BS-1 (100*a*) shares the CLI-RS configuration to the BS-2 (100*b*). At 502, the BS-2 (100*b*) forwards the CLI-IM configuration in terms of the CSI-IM to the second UE (200*b*). Further, the BS-2 (100*b*) forwards the CLI-RS configuration to receive and decode the CLI-RS to the second UE (200*b*). Further, the BS-1 (100*a*) forwards the CLI-RS configuration to the first UE (200*a*). At 503, the first UE (200*a*) transmits the CLI-RS in predefined locations at predefined time to the second UE (200*b*). At 504, the second UE (200*b*) calculates the received transmit power over CLI-RS which is CLI-RSRP. At 505, the second UE (200*b*) transmits the CLI-RSRP using the reporting configuration specified to the BS-2 (100*b*).

Figure 6:
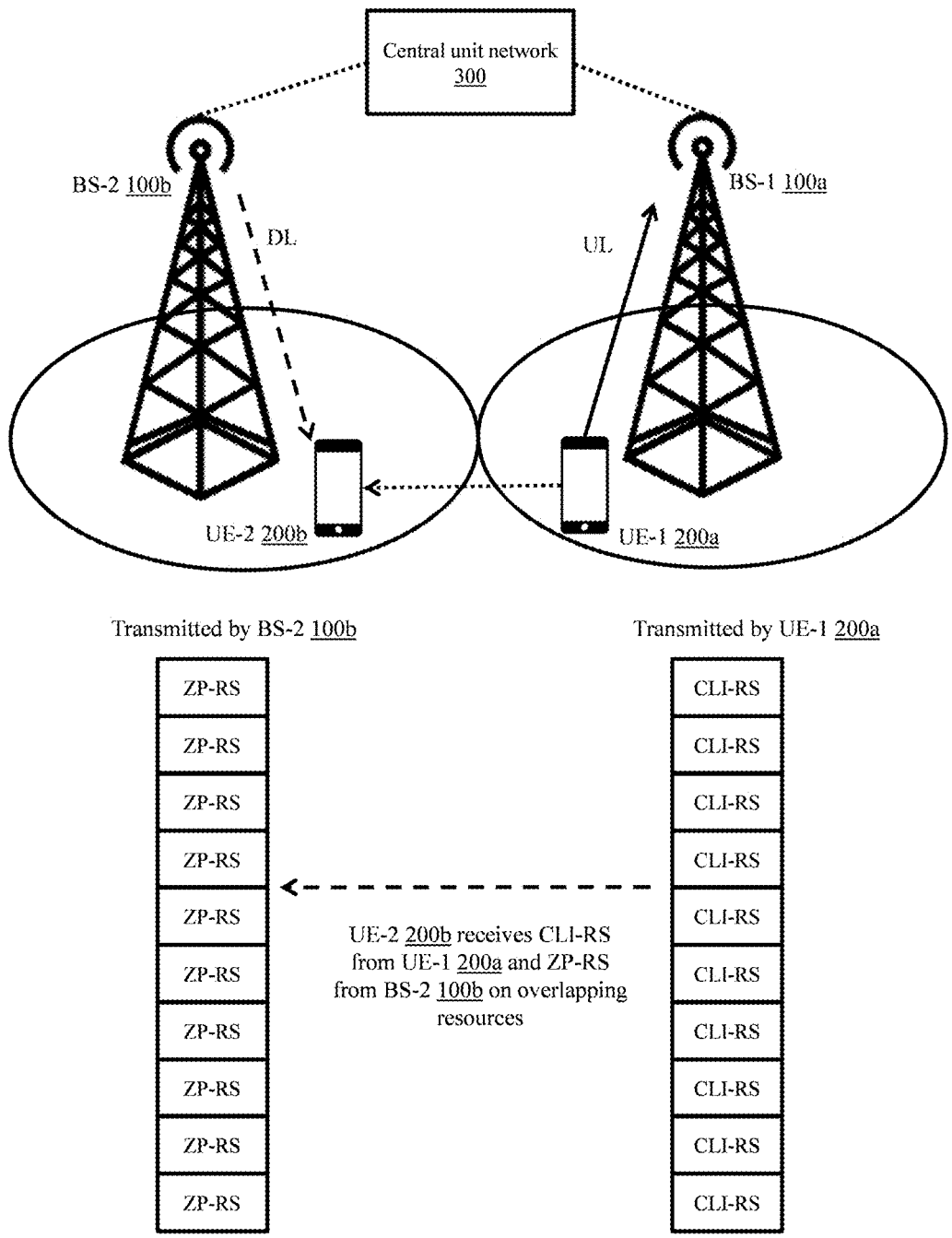
FIG. 6 illustrates a UE-to-UE CLI measurement procedure based on RSRP by using the CLI-RS and zero power RS (ZP-RS), according to embodiments as disclosed herein.

FIG. 6 illustrates a UE (200*a*) to UE (200*b*) CLI measurement procedure based on RSRP by using the CLI-RS and ZP-RS, according to embodiments as disclosed herein;

In order to mitigate the CLI, it has to be measured at the UE (e.g. 200*a*, 200*b*) over short or long term. Long term measurement can be done based on specific sequence power detection, like RSRP and/or energy detection like RSSI to obtain an average CLI that remains constant for a long duration. Similarly, short term CLI measurement can be done using specific sequence power detection and/or energy detection to obtain instantaneous CLI that changes frequently.

The second UE (200*b*) transmits CLI-reference signal (CLI-RS) as shown in FIG. 6 which is used for CLI measurement in terms of RSRP. It is called as CLI-RSRP. The sounding reference signal (SRS) in long term evolution (LTE)/NR can also be used for CLI measurement at the first UE (200*a*).

The BS-1 (100*a*) signals the UE-1 (200*a*) to transmit one or more CLI-RS in pre-determined time-frequency resources aperiodically. It may also signal one of the CLI-RS sequence(s), cyclic shift(s), periodicity, etc. Aperiodic CLI-RS is configured with a trigger using a mac layer or physical layer signaling e.g. downlink control information (DCI). Simultaneously, in the same time-frequency resources, the BS-2 (100*b*) configures zero power RS (ZP-RS) for the UE-2 (200*b*) where no signal is transmitted at the RS locations to avoid potential DL interference. The channel state information-interference measurement (CSI-IM) resources specified in LTE/NR can also be configured as ZP-RS. The ZP-RS used for interference measurement is illustrated in FIG. 6.

Figure 7:
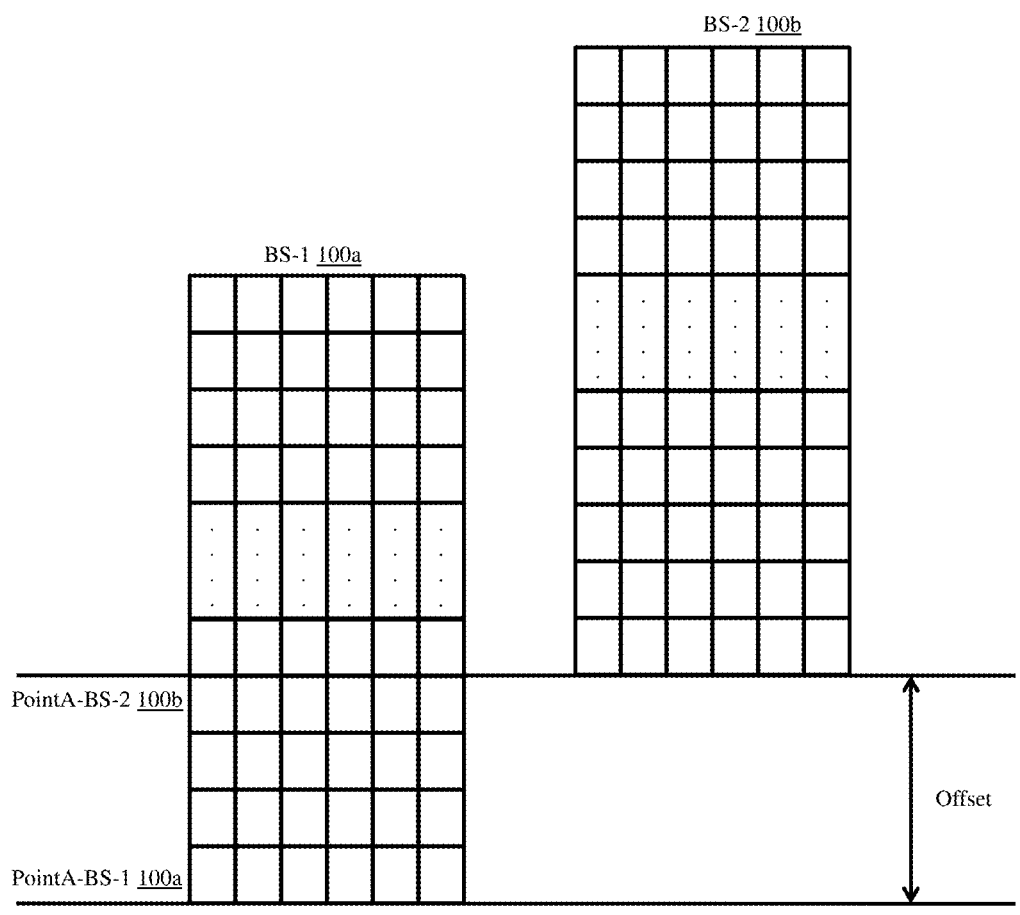
FIG. 7 illustrates a second BS configures the second UE for CLI measurement based on shared parameters and reference point for resource block grid of the BSs, according to embodiments as disclosed herein.

FIG. 7 illustrates the second BS (100*b*) configures the second UE (200*b*) for CLI measurement based on shared parameters and reference points for resource block grid of the BSs (i.e. 100*a*, 100*b*), according to embodiments as disclosed herein.

In order to measure RSRP of the received CLI-RS, the UE-2 (200b) needs to know certain parameters of the CLI-RS transmitted. The BS-1 (100a) shares the CLI-RS configuration information with the BS-2 (100b). Therefore, the CLI-RS configuration parameters have to be shared across the BSs (i.e. 100a, 100b). The BS-2 (100b) configures the UE-2 (200b) for CLI measurement based on these shared parameters.

In an embodiment, sharing at least one of the parameters required to identify the CLI-RS configuration to the BS-2 (100b) by the BS-1 (100a) or a common CLI-RS configuration is used by all BSs (BS-1 (100a) and BS-2 (100b)), which can be pre-configured or shared by the central unit network (300). The parameters are the reference point for resource block grid at the BSs (i.e. 100a, 100b), time-frequency resources of CLI-RS, sequence ID, sub-carrier spacing, etc. The reference point for resource block grid at the BS can be different across BSs (BS-1 (100a) and BS-2 (100b)). The BS-1 (100a) configures CLI-RS resources in the time-frequency grid with respect to the reference point of the BS-1 (100a).

Hence, the reference point of the BS-1 (100a) needs to be conveyed to the BS-2 (100b) for it to identify the exact CLI-RS resource configurations. These signaling overhead due to sharing of the reference point can be reduced by considering the CLI-RS common reference across all the BSs for CLI-RS transmission. The CLI-RS sequence generation will be based on a CLI-RS common reference. The sequence is generated and filled by the UE-1 (200a) in the resources allocated starting from the common reference. The UE-2 (200b) also generates the desired CLI-RS sequence with respect to the CLI-RS common reference and identifies the resources in which the UE-1 (200a) has transmitted the CLI-RS. Since, the CLI-RS common reference is the same across the BSs, it need not be shared.

In the NR, the parameter sharing can be done in the following ways.
  a. Sharing complete SRS configuration information.
  b. Reduced sharing of SRS configuration information by limiting parameters.
  c. Reduced sharing of SRS configuration information using common reference for SRS sequence generation and transmission.

For sharing complete SRS configuration information, it can be implemented by sharing all the parameters given in Table. 1.

TABLE 1

Parameters need to be shared by BS to identify the SRS configuration

| Parameter name | Definition |
| --- | --- |
| PointA | It is a common reference point for resource block grids in a base station node |
| Bandwidth part | A bandwidth part is a subset of contiguous common resource blocks used in DL and UL for group of UEs |
| Frequency domain shift | Start of SRS resource |
| Sequence ID | SRS sequence identifier |
| Cyclic shift | Cyclic rotation to base sequence |
| Numerology | Subcarrier spacing of SRS transmission |
| TransmissionComb | Inter leaving pattern for the SRS transmission |
| Comb Offset | Comb starting subcarrier in resource block |

TABLE 1-continued

Parameters need to be shared by BS to identify the SRS configuration

| Parameter name | Definition |
| --- | --- |
| c-SRS | Bandwidth configurations in LTE and NR |
| b-SRS | Bandwidth in terms of resource blocks |
| b-hop | No of frequency hopping bandwidths |
| Start position | Start symbol of SRS in slot defined in LTE and NR |

In the NR, the reference point for resource block grid is known as PointA. The BS-1 (100a) and the BS-2 (100b) have PointA-BS 1 and PointA-BS 2 respectively as shown in FIG. 7. The difference is shown by the offset. The BS-1 (100a) configures SRS resources to the UE-1 (200a) in the time-frequency grid with respect to the PointA-BS 1. Hence, the PointA-BS 1 needs to be conveyed to the BS-2 (100b) for properly conveying the SRS resources configurations. Similarly, the band of operation for the UE-1 (200a) and the UE-2 (200b) might be different and they might be partially overlapping. SRS will be configured to the presently active bandwidth part (BWP) only. Therefore, for the BS-2 (100b) to understand the BS-1 (100a)'s SRS configuration, BWP needs to be conveyed among nodes. Other parameters define the SRS resource in transmission grid along with sequence.

For reduced sharing of SRS configuration information by limiting parameters, limiting the some of the parameters required for SRS configuration to fix value or limited set of values to reduce signaling overhead. The parameters sequence ID, cyclic Shift, and TransmissionComb mentioned in Table. 1 are limited to fewer values as shown in Table. 2. Comb Offset is fixed to zero. Similarly, frequency hopping can be disabled. Therefore, the parameters b-SRS and b-hop are set to zero and c-SRS is limited to fewer values.

TABLE 2

Reduced parameter sharing for SRS configuration

| Parameter name | Definition |
| --- | --- |
| PointA | Share the offset between PointA or actual PointA |
| Bandwidth part | Share the offset between BWP or actual BWP |
| Frequency domain shift | Share the offset or actual shift |
| Sequence ID | Limit to value e.g. 32,128 ids |
| Cyclic shift | Limit to value e.g. 8 |
| Numerology | Configurable numerology for CLI from set (7.5 kHz, 15 kHz, 30 kHz, 60 kHz, 120 kHz) |
| TransmissionComb | Fix to specific value e.g. 2 |
| Comb Offset | 0 |
| c-SRS | Fix to specific value BWP size |
| b-SRS | Fix to specific value e.g. 0 |
| b-hop | 0 (hopping disabled) |
| Start position | Fix to specific value e.g. 6 |

Figure 8:
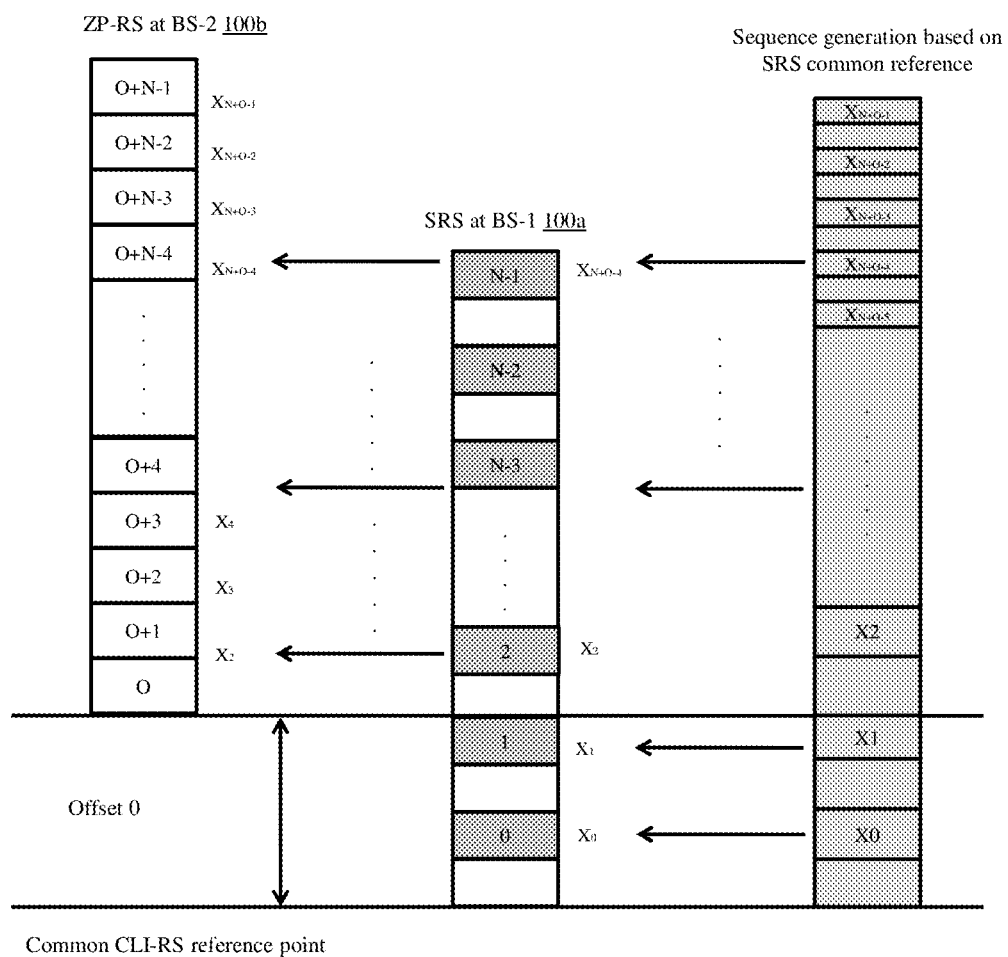
FIG. 8 illustrates a sounding reference signal (SRS) sequence filling based on CLI-RS common reference, according to embodiments as disclosed herein.

FIG. 8 illustrates a sounding reference signal (SRS) sequence filling based on CLI-RS common reference, according to embodiments as disclosed herein.

Rightmost column represents the CLI-RS sequence generated as a function of common reference $X_0$ to $X_n$. The middle column shows the CLI-RS configured by the BS-1 (100a) whose length is limited by the bandwidth part length.

In this example, the bandwidth part configured by BS-1 (100a) starts from the common reference and is up to N-1. Configuring CLI-RS as mentioned in middle column overlapping but the BS-2 (100b) configures a bandwidth part as shown by the left-most column which has an offset of O as compared to the common reference. The left-most column which is the represent bandwidth part configures by the BS-2 (100b) Therefore, it can configure CSI-IM/ZP-RS only within that bandwidth part. Offset between bandwidth parts is 'O'. With respect to the common reference case, the BS-2 (100b) can configure locations as mentioned in left-most column (its bandwidth part) and the received CLI-RS will be from $X_2$ to $X_{O+N-4}$ which is a function of locations from a common reference. Therefore, the BS-2 (100b) and eventually the UE-2 (200b) can identify the base sequences which are expected to be received over these locations needed for CLI-RS detection since the generation of the sequence is based on a common reference.

For reduced sharing of SRS configuration information using common reference for SRS sequence generation and transmission, in the above methods (i.e. (a) and (b)), the transmitter and receiver nodes may be operating on different BWPs. So, resource locations for SRS may be different. Therefore, sharing of freqDomainShift, BWP and PointA are necessary. These signaling overhead can be further reduced by considering a common reference for SRS transmission. As shown in FIG. 8, the SRS sequence generation is based on an SRS common reference. The sequence is generated starting from the common reference and it is filled in the resources allocated for SRS transmission by the UE-1 (200a). The UE-2 (200b) also generates the desired SRS sequence with respect to the SRS common reference and identifies the overlapping resources in which the UE-1 (200a) has transmitted the SRS. Since, the SRS common reference is the same across all nodes, the PointA-BS 1 information is not required anymore by the BS-2 (100b) even in the presence of offset O as shown in FIG. 8. The sequence generation for SRS will be represented as given in equation 1, $$r^{(p_i)}(n,l') = r_{u,v}^{(\alpha_i,\delta)}(n) \quad 0 \leq n \leq M_{sc,b}^{RS}-1 \quad l' \in \{0,1,\ldots,N_{symb}^{SRS}-1\} \quad (1)$$

Where, $M_{sc,b}^{RS} = BWP_{max} N_{SC}^{RB}/K_{TC}$
$r_{u,v}^{(\alpha_i,\delta)}(n)$ is the sequence where $\alpha_i$ is the cyclic shift,
$\delta = \log_2(K_{TC})$, u, v are group and base sequence number, respectively. $K_{TC}$ is transmission Comb,
l' is the symbol number,
$N_{symb}^{SRS}$ is the total number of SRS symbols,
$p_i$ is antenna port,
$BWP_{max}$ is carrier bandwidth,
$N_{SC}^{RB}$ is number of subcarriers in one resource block,
$M_{sc,b}^{RS}$ is the sequence length.

The resource allocation for SRS will be represented by equation 2, $$a_{K_{TC}k'+k_0^{(p_i)},l'+l_0}^{(p_i)} = \begin{cases} \frac{1}{\sqrt{N_{ap}}} \beta_{SRS} r^{(p_i)}(k'+k_{Offset},l') & \\ k'=0,1,\ldots,M_{sc,b}^{RS}-1 \quad l'=0,1,\ldots,N_{symb}^{SRS}-1 & \\ 0 \quad \text{otherwise} & \end{cases} \quad (2)$$

$\acute{M}_{sc,b}^{RS} = m_{SRS,b} N_{SC}^{RB}/K_{TC}$ a is the time-frequency resource,
$k_0^{(p_i)}$ is frequency-domain starting position,
$k_{Offset}$ is the frequency Domain Shift,
$l_0$ is the starting position in the time domain,
$N_{ap}$ is the number of antenna ports,
$\beta_{SRS}$ is amplitude scaling factor,
$m_{SRS,b}$ is number of resource blocks allocated for SRS.

For configuring CLI-RS and ZP-RS for CLI measurement, network (1000) initiates UE (200a) to UE (200b) CLI measurement by indicating the BSs (i.e. 100a, 100b) to configure CLI-RS and ZP-RS. The BS-1 (100a) configures CLI-RS for CLI measurement in the UE-1 (200a) and the same information is shared with the BS-2 (100b). By using this information the BS-2 (100b) configures ZP-RS overlapping with configured CLI-RS resources to the UE-2 (200b). Similarly, the BS-2 (100b) conveys CLI-RS resource configuration to the UE-2 (200b) for CLI-RS detection.

It is beneficial to have unified ZP-RS structure and CLI-RS structure which means they should be similar to each other with respect to time-frequency resources. CLI-RS resources will always be a subset of the ZP-RS resources so that the complete transmitted CLI-RS sequence remains uncontaminated at the receiver.

Further, a specific subcarrier spacing (SCS) is configured for UE (200b) to UE (200a) CLI measurement. The CLI-RS transmission and reception will be at the same SCS, e.g., 7.5 kHz, 15 kHz 30 kHz, 60 kHz, 120 kHz, etc. However, the repetition of CLI-RS over more than one OFDM symbol with a particular transmission SCS at the transmitter can also be realized as a comb structure with lower SCS. Hence, CLI measurement SCS can be configured lower than the transmission SCS of the UE-1 (200a).

In the case of the NR, the CSI-IM resource will be configured by higher layer signaling like radio resource control-information element (RRC-IE). The higher layer signaling for CSI-IM will indicate the associated SRS resource configuration to be used for CLI measurement. This can be indicated as an SRS resource ID in CSI-IM RRC-IE. The start of CLI measurement will be indicated aperiodically by triggering CSI-IM using dynamic triggering like mac or DCI. Some of the parameters in the SRS resource configurations indicated to the UE-2 (200b) and the UE-1 (200a) can be different. For example, the UE-1 (200a) is configured to repeat and transmit SRS over 4 symbols while the UE-2 (200b) is configured to detect SRS over only 1 symbol. However, CSI-IM resources at the UE-2 (200b) and received SRS resources at the UE-2 (200b) should overlap.

CLI-RS and ZP-RS for CLI measurement and reporting, central unit network (300) configures the BSs (i.e. 100a, 100b) to configure UEs (i.e. 200a, 200b) participating in CLI measurement to report CLI-RSRP. CLI-RSRP can be used by the BS to mitigate CLI. In NR, this reporting can be configured using one or more channel state information reporting settings given by RRC IE name as CSI-ReportConfig. CSI reporting settings are modified to convey the CSI-IM resources for CSI measurement. CSI-IM resources are configured to measure CLI and over these resources.

In another way, CSI reporting settings are used to convey the one or more SRS resources configured for CLI measurement. CSI reporting setting will contain one or more SRS resource IDs indicating the corresponding SRS resources. This will implicitly imply to UE that the configured SRS resources are CSI-IM resources for interference measurement. These resources need to be either rate matched for data transmission or configured as zero power transmission.

Figure 9:
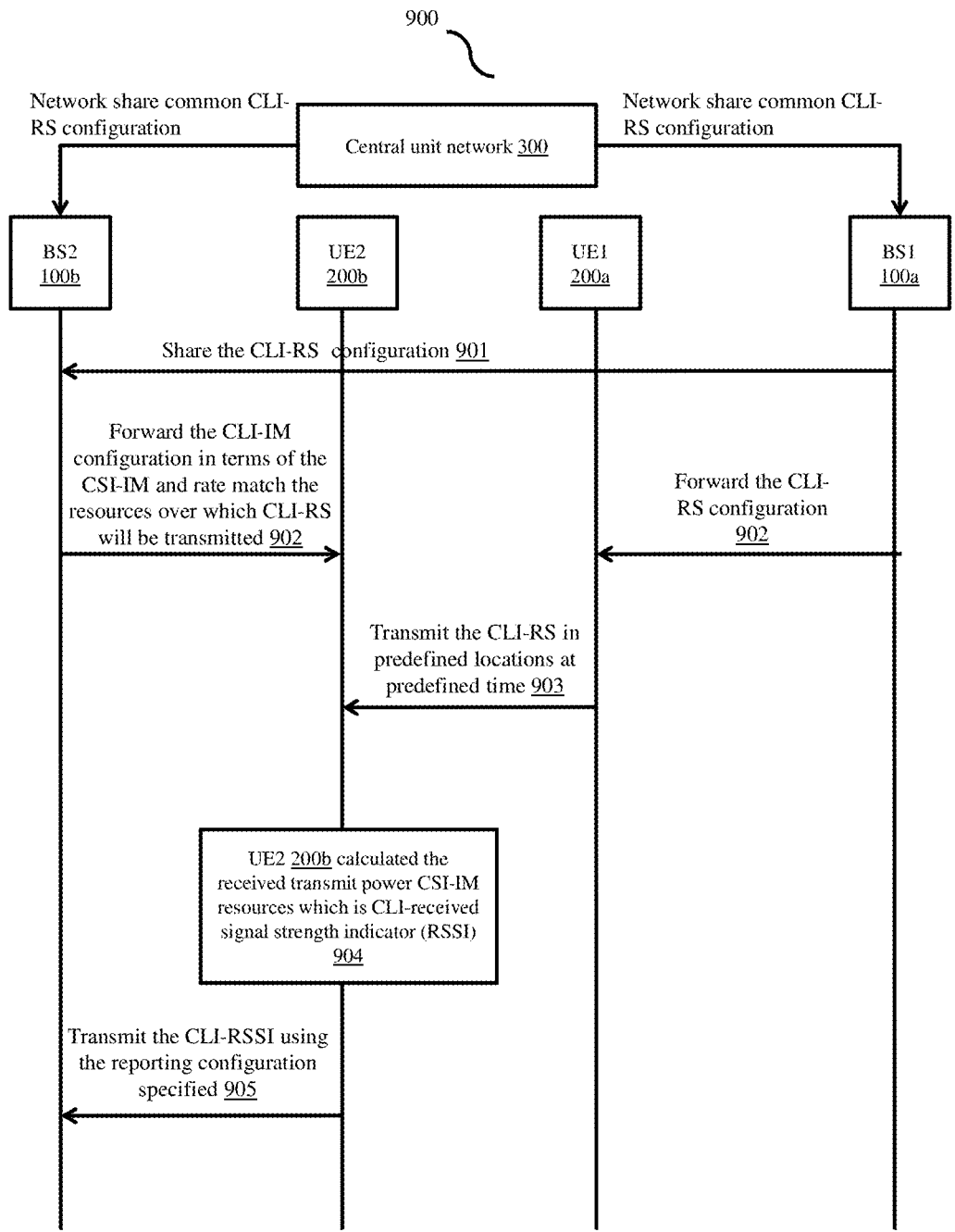
FIG. 9 is a sequence diagram illustrating logic of CLI-received signal strength indicator (RSSI) calculation, according to an embodiment as disclosed herein.

FIG. 9 is a sequence diagram (900) illustrating logic of CLI-RSSI calculation, according to an embodiment as disclosed herein.

RSSI is calculated by measuring the received signal strength. It is the total energy received in configured resources. It is called as CLI-RSSI. A central unit network (300) shares a common CLI-RS configuration to the BS-1 (100a) and the BS-2 (100b). At 901, the BS-1 (100a) shares the CLI-RS configuration to the BS-2 (100b). At 902, the BS-2 (100b) forwards the CLI-IM configuration in terms of the CSI-IM to the second UE (200b). Further, the BS-2 (100b) rate match the resources over which CLI-RS transmitted to the second UE (200b). Further, the BS-1 (100a) forwards the CLI-RS configuration to the first UE (200a). At 903, the first UE (200a) transmits the CLI-RS in predefined locations at predefined time to the second UE (200b). At 904, the second UE (200b) calculates the received transmit power CSI-IM resources which is CLI-RSSI. At 905, the second UE (200b) transmits the CLI-RSSI using the reporting configuration specified to the BS-2 (100b).

Similar to RSRP based method (refer FIG. 5), the BS-2 (100b) configures CLI-RS to the UE-2 (200b) for measuring CLI-RSSI. The UE-1 (200a) needs to measure the CLI-RSSI of this transmitted CLI-RS from the UE-2 (200b). The CLI-RS can be SRS or demodulation reference signal (DMRS) in the NR. To avoid DL contamination while RSSI measurement, ZP-RS will be configured at the UE-1 (200a) which will overlap with the CLI-RS transmitted from the UE-2 (200b). The BS-1 (100a) needs to know the CLI-RS resource configuration of the UE-2 (200b) from the BS-2 (100b) to configure ZP-RS resources accordingly. Hence, the BS-2 (100b) shares the CLI-RS configuration information to the BS-1 (100a). One of the methods mentioned in the RSRP based method for BS (100a) to BS (100b) information sharing can be used here. The BS-1 (100a) uses this information to configure ZP-RS for the UE-1 (200a) and conveys the ZP-RS configuration to it. Since only RSSI is to be measured, there is no need for the BS-1 (100a) to convey CLI-RS configuration information to the UE-1 (200a).

FIG. 10 illustrates a CSI-IM-Resource IE modification, according to an embodiment as disclosed herein. RRC IE in NR can be modified as shown in FIG. 10. The IE for CSI-IM-Resource provides the sub carrier location and symbol location where the BS-2 (100b) transmits nothing. These resources can be used for reception of SRS from the UE-1 (200a) and the UE-2 (200b) as per FIG. 6. The SRS configuration IE index can be convey to UE 2 providing the index in CSI_IM-Resource IE. The highlighted part is the modification for CSI-IM configuration for CLI measurement. SRS id is added in IE as associated SRS ID for CLI measurement.

FIG. 11 illustrates a CSI-ReportConfig IE modification, according to an embodiment as disclosed herein. The CSI-ReportConfig IE is modified as shown in FIG. 11. As per figure, CSI-IM resource for CLI will be indicated in CSI-reporting configuration IE for CLI reporting and reporting quantity will be set to CLI-RSRP or CLI-RSSI. The BS-2 (100b) can indicated to the UE-2 (200b) at least one of the CLI-RSSI and CLI-RSRP to be reported using the CSI-ReportConfig IE along with CLI resource (i.e. CSI-IM).

For CLI measurement with asynchronous detection of CLI-RS, in the UE (200a) to UE (200b) CLI management CLI-RS transmission among the UEs (i.e. 200a, 200b) will not always be synchronized because the UE-1 (200a) and UE-2 (200b) are synchronized with the BS-1 (100a) and BS-2 (100b) respectively with its respective timing advances (TAs) which are different. The UE-1 (200a) will not be able to detect the CLI-RS transmitted from the UE-2 (200b) due to unknown symbol boundaries caused by the difference in TA. This issue is addressed by designing the transmit signal in such a way that UE 1 is able to detect the CLI-RS in spite of not knowing the symbol boundaries. There are two methods to design the transmit signal.

The same CLI-RS is repeated over a number of consecutive OFDM symbols with a block-cyclic prefix (CP) for the whole set of consecutive symbols. Block CP is a common CP for the set of consecutive OFDM symbols. This ensures that the time domain circularity for a symbol is maintained at the receiver at any part within the set of symbols. The block CP addition might require a separate chain of implementation in transmitter.

In another method, the block CP can be implemented using regular CP as in OFDM systems by one of the following ways.

a. CLI-RS sequence in the last OFDM symbol within the set of OFDM symbols is filled as it is. Whereas in the rest of the symbols within the set, the same sequence is filled after frequency domain phase rotation. The phase rotation here is given by the equation below.

$$R_i^m = X_i e^{\frac{-j2\pi(R-m)Li}{N_{FFT}^T}} \quad (3)$$

$R_i^m$ is the information to be filled in the $m^{th}$ OFDM symbol, R is the total number of symbols in set, i is the subcarrier index, X is the information like the actual message or the base sequence of RS, L is the number of samples in CP and $N_{FFT}^T$ is the FFT size at the transmitter.

b. CLI-RS sequence in the first OFDM symbol within the set of OFDM symbols is filled as it is. Whereas in the rest of the symbols within the set, the same sequence is filled after frequency domain phase rotation. The phase rotation here is given by the equation below.

$$R_i^m = X_i e^{\frac{-j2\pi(R-m)Li}{N_{FFT}^T}} \quad (4)$$

$R_i^m$ is the information to be filled in the $m^{th}$ OFDM symbol m takes value from 0 to R−1, R is total number of symbols in set, i is the subcarrier index, X is the information like the actual message or the base sequence of RS, L is the number of samples in CP and $N_{FFT}^T$ is the FFT size at the transmitter.

For detection of CLI-RS at UE 1, at least one OFDM symbol is indicated by the BS-1 (100a) for detection purposes. The BS-1 (100a) or network decides the symbol for the measurement of CLI based on the TAs of UE-1 (200a) and UE-2 (200b).

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for enabling a cross link interference (CLI) measurement using a CLI reference signal (CLI-RS) resource in a wireless network (1000), wherein the method comprises:
   receiving, by a first BS (100a), a first CLI-RS configuration by one of a second BS (100b) and a centralized network entity (300) connected to the first BS (100a), wherein the first CLI-RS configuration comprises at least a first set of CLI-RS resources with a common reference point;
   transmitting, by the first Base station (BS) (100a) associated with a first user equipment (UE) (200a), the first CLI-RS configuration to the first UE (200a);
   receiving, the second BS (100b), a second CLI-RS configuration by one of the first BS (100a) and the centralized network entity (300) connected to the second BS (100b), wherein the second CLI-RS configuration comprises at least a second set of CLI-RS resources with the common reference point
   transmitting, by the second BS (100b) associated with a second UE (200b), the second CLI-RS configuration to the second UE (200b), wherein the common reference point is a frequency domain resource location, wherein the first set of CLI-RS resources indicated by the first CLI-RS configuration overlaps with the second set of CLI-RS resources indicated in the second CLI-RS configuration;
   generating, by the first UE (200a), a CLI-RS sequence using the first CLI-RS configuration;
   filling, by the first UE (200a), the CLI-RS sequence in the first set of CLI-RS resources indicated in the first CLI-RS configuration starting from the common reference point;
   transmitting, by the first UE (200a), the CLI-RS sequence to the second UE (200b);
   receiving, by the second UE (200b), the CLI-RS sequence transmitted by the first UE (200a); and
   processing, by the second UE (200b), the received CLI-RS sequence in overlapped part of the first set of CLI-RS resources and the second set of CLI-RS resources based on the second CLI-RS configuration.

2. The method as claimed in claim 1, wherein the processing the received CLI-RS sequence in the overlapped part of the first set of CLI-RS resources and the second set of CLI-RS resources based on the second CLI-RS configuration comprises:
   determining, by the second UE (200b), a received power of the CLI-RS sequence; and
   reporting, by the second UE (200b), the received power to the second BS (100b) based on a reporting configuration provided by the second BS (100b).

3. The method as claimed in claim 2, wherein the received power is determined using at least one of a CLI-reference signal received power (CLI-RSRP) and CLI-received signal strength indicator (CLI-RSSI).

4. The method as claimed in claim 3, wherein the CLI-RSRP is determined by:
   detecting, by the second UE (200b), the CLI-RS sequence transmitted by the first UE (200a);
   measuring, by the second UE (200b), a linear average of the received power of the CLI-RS sequence over the second set of CLI-RS resources indicated in the second CLI-RS configuration; and
   determining, by the second UE (200b), the CLI-RSRP based on the detected the CLI-RS sequence and the measured linear average of the received power.

5. The method as claimed in claim 3, wherein the CLI-RSSI is determined by:
   measuring, by the second UE (200b), a linear average of the received power of the CLI-RS sequence over the second set of CLI-RS resources indicated in the second CLI-RS configuration; and
   determining, by the second UE (200b), the CLI-RSSI based on the measured linear average.

6. The method as claimed in claim 3, wherein the reporting configuration comprises the second CLI-RS configuration and at least one of the CLI-RSRP and the CLI-RSSI.

7. The method as claimed in claim 1, wherein the first set of CLI-RS resources indicated in the first CLI-RS configuration comprise at least one of a start index of frequency domain resource, a number of frequency domain resource, a start index of the time domain resource, a number of time domain resources, a CLI-RS sequence Identifier (ID), a number of antenna ports, a time domain behavior, the common reference point for the CLI-RS sequence generation and a quasi-co-location (QCL) assumption.

8. The method as claimed in claim 1, wherein the second set of CLI-RS resources indicated in the second CLI-RS configuration comprise at least one of a start index of frequency domain resource, a number of frequency domain resource, a start index of the time domain resource, a number of time domain resources, a CLI-RS sequence Identifier (ID), a number of antenna ports, a time domain behavior, the common reference point for the CLI-RS sequence generation and a quasi-co-location (QCL) assumption.

9. The method as claimed in claim 8, wherein the common reference point used to identify the start index of resource in frequency domain for the CLI-RS sequence generation.

10. The method as claimed in claim 1, wherein the first set of CLI-RS resources indicated by the first CLI-RS configuration overlaps in one of fully and partially with the second set of CLI-RS resources indicated in the second CLI-RS configuration.

11. The method as claimed in claim 1, wherein the second CLI-RS configuration configured at the second UE (200b) is one of a Zero Power (ZP-RS) configuration.

12. The method as claimed in claim 11, wherein the ZP-RS configuration indicates at least one resource over which the second BS (100b) has not transmitted any signal.

13. The method as claimed in claim 12, wherein the at least one resources overlaps in one of fully and partially with the first set of CLI-RS resources indicated in the first CLI-RS configuration.

14. The method as claimed in claim 1, wherein the first CLI-RS configuration configured at the first UE (200a) is a sounding reference signal (SRS) configuration.

15. The method as claimed in claim 14, wherein the SRS configuration contains a plurality of parameters comprising a quasi-co-location assumption (QCL), SRS sequence ID, pointA, a frequency domain shift, a cyclic shift, a numerology, comb pattern for SRS transmission, a comb offset, number of resource blocks,, a bandwidth part configuration, a start symbol of SRS, number of SRS symbols, the common reference point for SRS sequence and repetition factor.

16. The method as claimed in claim 15, wherein at least one of the SRS sequence ID and the common reference point for SRS sequence generation are used to generate a SRS sequence.

17. The method as claimed in claim 15, wherein the plurality of parameters are limited based on a number of UEs suffering from the CLI.

18. The method as claimed in claim 1, wherein transmitting, by the first UE (200a), the CLI-RS sequence comprises one of:
   repeating, by the first UE (200a), the first set of CLI-RS resources over a number of consecutive Orthogonal frequency-division multiplexing (OFDM) symbols with a block cyclic prefix (CP); and
   repeating, by the first UE (200a), the first set of CLI-RS resources over a number of consecutive OFDM symbols, with a phase rotation except a last symbol of the set of OFDM symbols.

19. The method as claimed in the claim 18, wherein the block CP is a common CP for the set of consecutive OFDM symbols.

20. A system for enabling a cross link interference (CLI) measurement using a CLI reference signal (CLI-RS) resource in a wireless network (1000), wherein the system comprises:
   a first base station (BS) (100a) associated with a first UE (200a);
   a second BS (100b) associated with a second UE (200b); and
   a centralized network entity (300) connected to the first BS (100a) and the second BS (100b),
   wherein the first BS (100a) configured to receive a first CLI-RS configuration by one of the second BS (100b) and the centralized network entity (300) connected to the first BS (100a), and transmit the first CLI-RS configuration to the first UE (200a), wherein the first CLI-RS configuration comprises a first set of CLI-RS resources with a common reference point for CLI-RS sequence generation,
   wherein the second BS (100b) is configured to receive a second CLI-RS configuration by one of the first BS (100a) and the centralized network entity (300) connected to the second BS (100b), and transmit the second CLI-RS configuration to the second UE (200b), wherein the second CLI-RS configuration comprises a second set of CLI-RS resources with the common reference point, wherein the common reference point is a frequency domain resource location, wherein the first set of CLI-RS resources indicated by the first CLI-RS configuration overlaps with the second set of CLI-RS resources indicated in the second CLI-RS configuration,
   wherein the first UE (200a) is configured to generate a CLI-RS sequence using the first CLI-RS configuration, fill the CLI-RS sequence in the first set of CLI-RS resources indicated in the first CLI-RS configuration starting from the common reference point, and transmit the filled CLI-RS sequence to the second UE (200b), and
   wherein the second UE (200b) configured to the CLI-RS sequence transmitted by the first UE (200a) and process the received CLI-RS sequence in overlapped part of the first set of CLI-RS resources and the second set of CLI-RS resources based on the second CLI-RS configuration.

21. The system as claimed in claim 20, wherein the first set of CLI-RS resources indicated in the first CLI-RS configuration comprise at least one of a start index of frequency domain resource, a number of frequency domain resource, a start index of the time domain resource, a number of time domain resources, a CLI-RS sequence Identifier (ID), a number of antenna ports, a time domain behavior, the common reference point for the CLI-RS sequence generation and a quasi-co-location (QCL) assumption.

22. The system as claimed in claim 20, wherein the first set of CLI-RS resources indicated by the first CLI-RS configuration overlaps in one of fully and partially with a second set of CLI-RS resources indicated in a second CLI-RS configuration.

23. The system as claimed in claim 20, wherein the second set of CLI-RS resources indicated in the second CLI-RS configuration comprise at least one of a start index of frequency domain resource, a number of frequency domain resource, a start index of the time domain resource, a number of time domain resources, a CLI-RS sequence Identifier (ID), a number of antenna ports, a time domain behavior, the common reference point for the CLI-RS sequence generation and a quasi-co-location (QCL) assumption.

24. The system as claimed in claim 23, wherein the common reference point is used to identify the start index of resource in frequency domain.

25. The system as claimed in claim 20, wherein the first CLI-RS configuration configured at the first UE (200a) is a sounding reference signal (SRS) configuration.

26. The system as claimed in claim 25, wherein the SRS configuration contains a plurality of parameters comprising a quasi-co-location assumption (QCL), a SRS sequence ID, pointA, a frequency domain shift, a cyclic shift, a numerology, comb pattern for SRS transmission, a comb offset, number of resource blocks,, a bandwidth part configuration, a start symbol of SRS, number of SRS symbols, the common reference point for the SRS sequence generation, and repetition factor.

27. The system as claimed in claim 26, wherein the SRS sequence ID is used to generate a SRS sequence, and wherein the SRS sequence is generated staring from the common reference point for a CLI-RS sequence generation.

28. The system as claimed in claim 26, wherein the plurality of parameters are limited based on a number of UEs suffering from the CLI.

29. The system as claimed in claim 20, wherein the second CLI-RS configuration configured at the second UE (200b) is one of a Zero Power (ZP-RS) configuration.

30. The system as claimed in claim 29, wherein the ZP-RS configuration indicates at least one resource over which the second BS (100b) has not transmitted any signal.

31. The system as claimed in claim 30, wherein the at least one resources overlaps in one of fully and partially with a first set of CLI-RS resources indicated in a first CLI-RS configuration.

32. The system as claimed in claim 20, wherein transmit the CLI-RS sequence by one of:
   repeating, by the first UE (200a), the first set of CLI-RS resources over a number of consecutive Orthogonal frequency-division multiplexing (OFDM) symbols with a block cyclic prefix (CP); and
   repeating, by the first UE (200a), the first set of CLI-RS resources over a number of consecutive OFDM symbols, with a phase rotation except a last symbol of the set of OFDM symbols.

33. The system as claimed in claim 20, wherein process the received CLI-RS sequence in the overlapped part of the first set of CLI-RS resources and the second set of CLI-RS resources based on the second CLI-RS configuration comprises:
   determining, by the second UE (200b), a received power of the CLI-RS sequence; and reporting, by the second UE (200b), the received power to a second BS (100b) based on a reporting configuration provided by the second BS (100b).

34. The as claimed in claim 33, wherein the received power is determined using at least one of a CLI- reference signal received power (CLI-RSRP) and CLI-received signal strength indicator (CLI-RSSI).

35. The as claimed in claim 34, wherein the CLI-RSRP is determined by:
   detecting, by the second UE (200b), the CLI-RS sequence transmitted by the first UE (200a);
   measuring, by the second UE (200b), a linear average of the received power of the CLI-RS sequence over a second set of CLI-RS resources indicated in the second CLI-RS configuration; and
   determining, by the second UE (200b), the CLI-RSRP based on the detected the CLI-RS sequence and the measured linear average of the received power.

36. The as claimed in claim 34, wherein the CLI-RSSI is determined by:
   measuring, by the second UE (200b), a linear average of the received power of the CLI-RS sequence over the second set of CLI- RS resources indicated in the second CLI-RS configuration; and
   determining, by the second UE (200b), the CLI-RSSI based on the measured linear average.

37. The as claimed in claim 33, wherein the reporting configuration comprises the second CLI-RS configuration and at least one of the CLI-RSRP and the CLI-RSSI.

* * * * *